United States Patent [19]

von Schnurbein et al.

[11] 4,106,289

[45] Aug. 15, 1978

[54] EXHAUST SYSTEM IN A TWO-STROKE-CYCLE MULTICYLINDER INTERNAL COMBUSTION ENGINE

[75] Inventors: Eglof von Schnurbein, Augsburg; Jakob Bucher, Bobingen; Thomas Mikota, Wulfertshausen, all of Fed. Rep. of Germany

[73] Assignee: Maschinenfabrik Augsburg-Nurnberg Aktiengesellschaft, Augsburg, Fed. Rep. of Germany

[21] Appl. No.: 624,232

[22] Filed: Oct. 20, 1975

[30] Foreign Application Priority Data

Oct. 18, 1974 [DE] Fed. Rep. of Germany ....... 2449628

[51] Int. Cl.$^2$ .......................... F02B 27/04; F01N 7/10
[52] U.S. Cl. .......................................... 60/314; 60/323
[58] Field of Search ................... 60/314, 312, 323, 282

[56] References Cited

U.S. PATENT DOCUMENTS

| | | | |
|---|---|---|---|
| 2,102,559 | 12/1937 | Kadenacy | 60/314 |
| 2,581,668 | 1/1952 | Kadenacy | 60/312 |
| 3,462,947 | 8/1969 | Nowak | 60/314 |
| 3,577,728 | 5/1971 | Brimer | 60/303 |
| 3,581,494 | 6/1971 | Scheitlin | 60/323 |
| 3,665,712 | 5/1972 | Tenney | 60/314 |
| 3,872,667 | 3/1975 | Rosenlund | 60/282 |
| 3,946,558 | 3/1976 | Beekhuis | 60/282 |

FOREIGN PATENT DOCUMENTS 1,239,524  4/1967  Fed. Rep. of Germany ............ 60/302

*Primary Examiner*—Douglas Hart
*Attorney, Agent, or Firm*—Flynn & Frishauf

[57] ABSTRACT

Connecting exhaust ducts of gradually widening cross section lead from the exhaust ports of a particular cylinder to a common manifold, being continued inside the manifold for a length greater than half of the diameter of the manifold and leaving an outflow cross section between the end of the connecting duct and the facing wall of the manifold equal to or slightly greater than the exit cross section of the connecting duct. Between junctions with the connecting ducts the manifold has sections of constricted cross section, providing baffling between the connecting ducts. The arrangement enables the kinetic energy of the outflow of exhaust gas to be more effectively utilized for sucking in the scavenging air.

10 Claims, 5 Drawing Figures

EXHAUST SYSTEM IN A TWO-STROKE-CYCLE MULTICYLINDER INTERNAL COMBUSTION ENGINE

The invention relates to an improvement in a two-cycle multicylinder internal combustion engine that is either unsupercharged or is supercharged by an exhaust-driven turbosupercharger with constant pressure exhaust system, and more particularly to an improvement in the exhaust system of such an engine of the kind in which the exhaust manifold is connected to the exhaust port openings of each cylinder by one or more individual exhaust ducts. Engines of this general type are known from a printed description entitled "Two-stroke — Cycle Diesel Motor KSZ 78/155 — Brief Description of the Motor" published by the manufacturer, Maschinenfabrik Augsburg-Nürnberg Aktiengesellschaft (generally Known as M.A.N.).

It is an object of the present invention to provide a motor of this type with improved scavenging process.

SUMMARY OF THE INVENTION

Each connecting exhaust duct carrying exhaust gas from a single cylinder is prolonged within the manifold and the end portion projecting within the manifold extends for a length not less than half the diameter of the manifold and is directed substantially perpendicularly to the longitudinal axis of the manifold.

In this way the possibility is given, for a predetermined position of the manifold with respect to the engine, to obtain an optimum length for the connecting exhaust ducts. This leads, on the one hand, to extensive suppression of the backflow of exhaust gas into the cylinder when the pressure in the manifold rises because of the exhaust discharge pulse produced by another cylinder, because in this case the end of the lengthened connecting exhaust duct that adjoins the cylinder mainly contains scavenging air at this stage. Moreover, the use of the invention provides a stronger vacuum in the cylinder as the result of the larger gas mass in the connecting exhaust duct, which provides a favorable suction for the intake of scavenging or air. The sections of the connecting exhaust ducts projecting into the manifold, moreover, locally change the cross-section of the manifold and thereby provide damping of the pressure waves running through the manifold, so that disturbances scavenging period by steep pressure gradients from other cylinders are mitigated.

According to one form of the invention, at least the exit end of each connecting exhaust duct forms a diffusser. This assures, on the one hand, substantially loss-free flow of the exhaust gases in the connecting ducts and, on the other hand, the pressure drop in the cylinder during the blow-down period is accelerated. Particularly in the case of engines having exhaust ports above the air inputs, it is possible in this way to delay the moment of opening of the exhaust port and, in that way, to obtain a longer working stroke and thus a better utilization of the fuel.

In a further elaboration of the invention, each of the connecting exhaust ducts is provided at least in the region of the portion projecting into the manifold, with a continuously broadening cross-section so as to perform the function of a diffuser.

According to another elaboration of the invention, each connecting exhaust duct extends into the manifold for such a distance that the outflow area between the connecting duct and the facing wall of the manifold is equal to or slightly greater than the exit cross-sectional area of the connecting duct, so as to form baffle-type pressure-gradient diffuser.

Optimum operation is obtainable if the entire connecting exhaust duct has a gradual cross-sectional broadening and forms a pressure gradient diffuser at its exit opening in cooperation with the wall of the manifold acting as a baffle.

It is further advantageous that the narrowest cross-section of each connecting exhaust duct should be substantially equal to the sum of the cross-sections of the exhaust ports of the cylinder that discharge into the connecting duct. This avoids undesirable throttling between the cylinder and the manifold and also provides favorable flow conditions along the duct walls.

In accordance with an additional elaboration of the invention, the manifold is constricted between its junctions with the connecting exhaust ducts. These constrictions can be advantageously provided by making the manifold out of tube sections of different diameter. This arrangement leads to further cross-sectional changes of the manifold and thus to additional baffling and damping of the pressure waves generated by the opening of the exhaust port of each individual cylinder. In order to improve this damping further, it is advantageous to provide unsymmetrical conditions for the flow of the exhaust gases past the connecting ducts in the longitudinal direction of the manifold, by disposing the connecting exhaust ducts eccentrically relative to the axis of the manifold.

The invention is further described by way of illustrative example, with reference to the accompanying drawings, in which.

Figure 1:
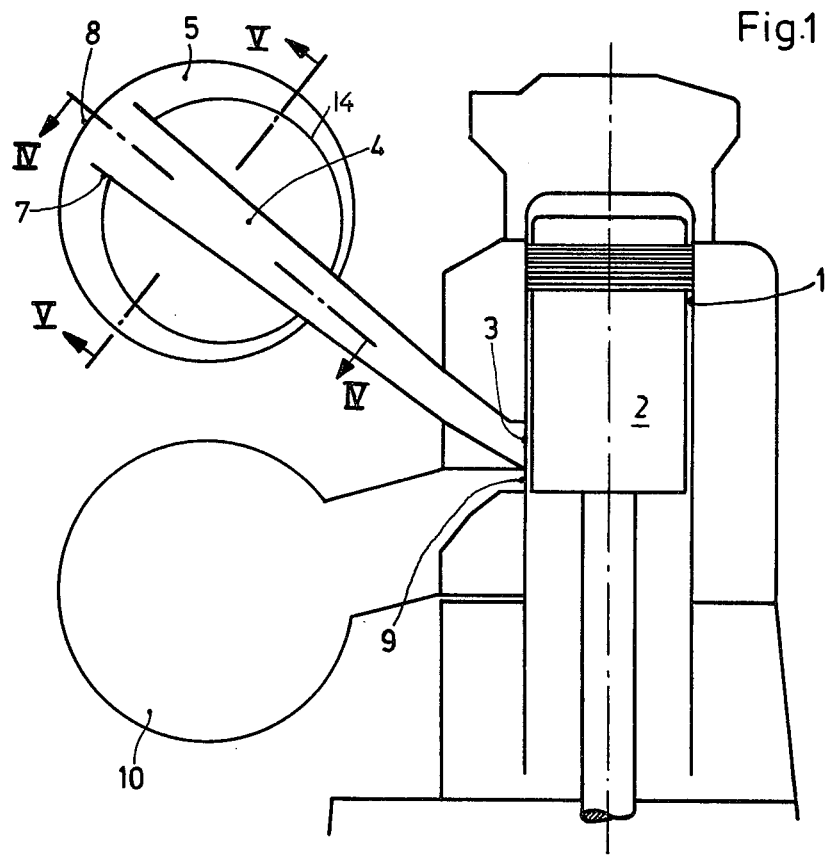
FIG. 1 is a diagrammatic cross-section of a two-stroke-cycle engine with an exhaust system in accordance with the invention.

In FIG. 1 there is shown a cylinder 2 of a two-stroke-cycle internal combustion engine in which a piston 2 moves up and down. Lateral exhaust ports 3 are provided for the exhaust gas, the ports being opened and closed by the movement of the piston. The exhaust ports 3 of each cylinder 1 are connected with a connecting exhaust duct 4 that is individual to the cylinder. The cross-sectional area at the exhaust gas entrance of each connecting exhaust duct 4 is so dimensioned that it is approximately equal to the sum of the cross-sectional areas of the corresponding exhaust ports 3 of the cylinder 1. The connecting exhaust ducts 4 are extended to and into an exhaust manifold 5, which extends along an axis perpendicular to the plane of the drawing. The ends 7 of the connecting exhaust ducts 4 projecting into the manifold 5 should extend into the manifold 5 for a length not less than half of the diameter of the manifold 5. In the illustrated embodiment, the connecting exhaust ducts 4 extend so far into the manifold 5 that the free passage cross-section for the exhaust gas between the end 7 of each connecting exhaust duct 4 and the facing wall 8 of the manifold 5 is somewhat greater than the cross-sectional area of the connecting exhaust duct 4 at its end 7, so that the connecting exhaust duct 4 additionally forms a pressure-gradient diffusor in cooperation with the wall 8 of the manifold 5 acting as a baffle. Below the exhaust ports 3 for the exhaust gas expelled from the cylinder 1, there are openings 9 for the scavenging air which is supplied to the engine through an air duct 10.

Figure 2:
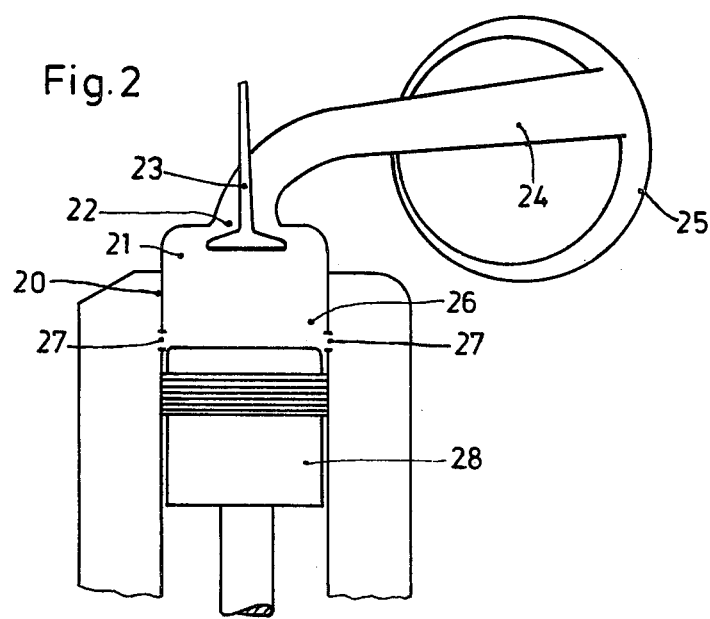
FIG. 2 is a diagrammatic representation of a two-stroke-cycle engine with overhead control valves having an exhaust system corresponding to the exhaust system shown in FIG. 1.

FIG. 2 shows a different illustrative embodiment of a two-stroke-cycle engine having an exhaust system in accordance with the invention. In this case, the cylinder 20 is provided at its upper-end region 21 with an exhaust port 22 controlled by a valve 23. These exhaust ports 22 are each connected with a connecting exhaust duct 24 that opens into a manifold 25, as already described in FIG. 1. In this case, however, the connecting exhaust duct 24 is bent and is positioned eccentrically to the longitudinal axis of the exhaust manifold. The openings 27 for the scavenging air are located in a lower region 26 of the cylinder. These openings 27 are distributed evenly around the circumference of the wall of the cylinder 20, since the embodiment shown is a two-stroke-cycle engine of the uniflow scavenging type. In this case, the admission of the scavenging air through the openings 27 is controlled directly by the piston 28.

Figure 3:
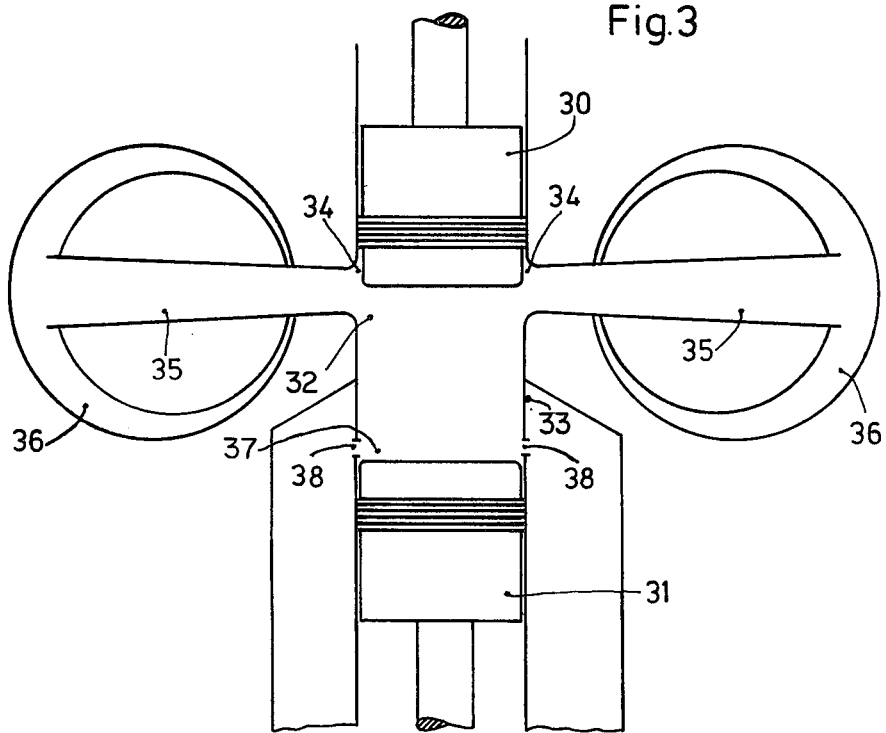
FIG. 3 is a diagrammatic representation of the cross-section of a two-stroke-cycle engine with opposed pistons with an exhaust system corresponding to thw representation of FIG. 1.

FIG. 3 shows another two-cycle engine with uniflow scavenging. In this case, counter-operating pistons 30 and 31 are provided. The exhaust ports in this case are in an upper region 32 of the cylinder 33 on opposite side of the cylinder 33. These exhaust ports 34 are connected with two connecting ducts per cylinder for the exhaust gas that each discharges into the manifold 36 in the same manner as described with reference to FIG. 1. As in FIG. 2, openings 38 for the scavenging air are provided in a lower region 37 of the cylinder 33. In this embodiment the openings 38 for the scavenging air are controlled by the piston 31 and the exhaust ports are controlled by the piston 30.

Figure 4:
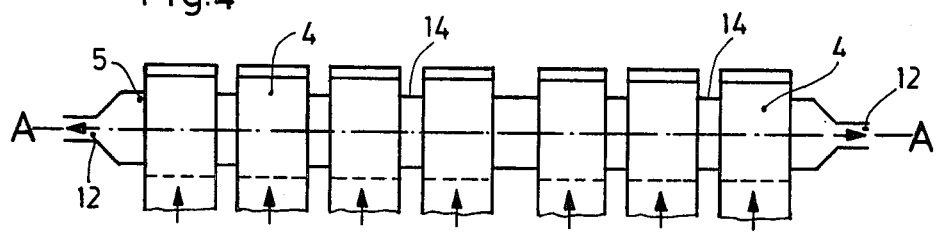
FIG. 4 is a cross-section along the line IV—IV of FIG. 1, on a smaller scale.
Figure 5:
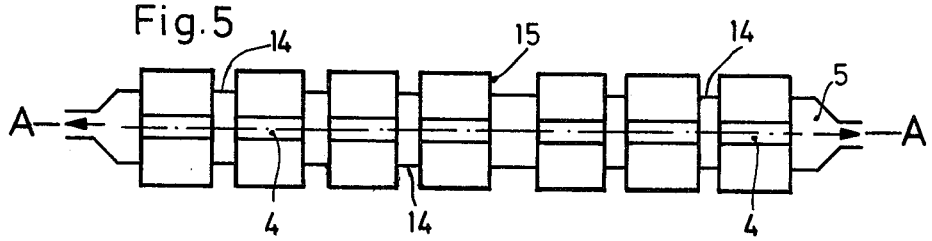
FIG. 5 is a cross-section along the line V—V of FIG. 1, likewise on a smaller scale.

FIGS. 4 and 5 provide further views for more complete description of the junctions of the connecting exhaust ducts 4 with the manifold 5. The connecting exhaust ducts 4 are of rectangular cross section and are directed perpendicularly to the axis A—A of the manifold 5. The longer sides of the rectangles of cross-section of the connecting duct 4 run parallel to the manifold axis A—A. The direction of flow of the exhaust gas in the connecting duct 4 and in the manifold 5 is indicated by arrows. The gas flows first along the axis of the connecting duct and then along the axis A—A of the manifold, dividing so as to flow towards the two end openings 12 and from there into an exhaust driven supercharger not shown in the drawing. From the relation of the sections shown in FIG. 4 and FIG. 5 to FIG. 1, it may be seen that the manifold 5 is made of tube sections of different diameter, the end of one of the smaller tube sections 14 being seen, for example, in FIG. 1. Thus, between the ends 7 of the connecting exhaust ducts 4 there are constricted short lengths 14 of the manifold 5, and as seen in FIG. 4, the axis of the manifold 5 is actually defined by the axes of these constricted cylindrical portions and in this particular embodiment the cylindrical wall 8 of the portion of the manifold that contains the junction with the connecting exhaust duct 4, which is likewise cylindrical, has an axis displaced from the axis of the portions 14 in the direction of the end 7 of the connecting duct 4. The constrictions 14 could have different cross-sectional areas, according to the arrangement of the connecting exhaust ducts 4, since these are in each case connected to the manifold 5 between two constrictions 14. The constrictions 14 provide lateral baffling between the junctions with the respective connecting exhaust ducts by virtue of the annular junction plates 15.

By means of the above-described arrangement the scavenging of the respective cylinders with air can be markedly improved. The possibility is provided to utilize the kinetic energy stored in the gas column in the connecting duct during the blow-down period for sucking the scavenging air into the cylinder 1, 20, 33 immediately after opening of the air inlet. With a shaping of the connecting exhaust ducts 4, 24, 35 connected to the exhaust ports in a manner chosen to favor this effect, the energy level of the gas column can be chosen at an optimum for the engine operation and can be utilized with small losses. The kinetic energy of the gas column in the connecting exhaust ducts 4, 24, 35 increases in magnitude with increasing degree of supercharging and is, moreover, directly utilized for the scavenging. The energy losses on the exhaust gas side are an that account smaller, so that the apparent through-flow resistance of the motor drops.

The form of the connecting exhaust ducts 4, 24, 35 constituted according to the principle of a diffuser have the further advantage that the pressure behind the exhaust ports 3, 22, 34 rises only a little during the pre-exhaust period. By pre-exhaust period in a two-cycle engine is to be understood the time after the exhaust ports have already opened while the scavenging ports are still closed. The pressure in the cylinder 1, 20, 33 must have dropped under the pressure in the scavenging manifold scavenging ports open, because otherwise the exhaust gases would flow through the scavenging ports into the scavenging air duct. As soon as the pressure in the cylinder 1, 20 and 33 has dropped below the scavenging pressure, the openings 9, 27, 38 for the scavenging air are to be opened.

There is a general improvement over the entire range of load conditions resulting from the use of the invention, but the improvement is particularly large under partial load conditions. The small spacing usable between the opening of the exhaust port and that of the inlet port has a positive effect at the beginning and, in the case of symmetrically controlled engines, it also has a positive influence at the end of the charge transition period. The suction effect of the column in the connecting exhaust duct 4, 24 35 markedly supports the setting up of the scavenging process. In the first phase of the scavenging process, which is also referred to as the displacement phase, the exhaust gas is expelled from the cylinder 1, 20 33 by the front of the scavenging air stream. Later on the scavenging air mixes with the residual gas in the cylinder. The fresh air component of the exhaust gases flowing out of the cylinder accordingly increases steadily during the scavenging period. If in the particular engine the maximum length of the connecting exhaust ducts 4, 24, 35 according to the invention is provided, in which the connecting ducts extends to just in front of the facing wall 8 of the manifold 5, 25, 36, these connecting exhaust ducts also operate positively during the so-called post-exhaust period. An aftercharge effect then takes place when another cylinder opens its exhaust ports 3, 22, 34 and exhaust gas is discharged through them suddenly. This discharge sets up pressure waves that run through the manifold 5, 25, 36. These pressure waves seek to push back the mixture of scavenging air and exhaust gas that has previosly been discharged from a cylinder. In the embodiment of FIG. 1, which the connecting exhaust ducts 4, 24, 35 are constituted in accordance with the invention, the residual exhaust gas quantity flowing back into the cylinder will be very slight, because at the cylinder end of the connecting exhaust duct there will be more scavenging air and very little exhaust gas. Moreover, as a result of the larger gas quantities in the connecting exhaust ducts 4, 24, 35 there will be a stronger vacuum in the cylinders 1, 20, 33 which results in a more favorable suction for the intake of scavenging air and of charging air. In the case of engines in which the exhaust ports 3, 22, 34 are located above the openings 9, 27, 38 for the scavenging air, it is then possible to delay the beginning of the exhaust puff and thereby to obtain a longer working stroke and accordingly a better utilization of the fuel.

The cross-section of the manifold 5, 25, 36 is varied along the length of the manifold by the constrictions 14, as is evident from FIGS. 4 and 5, so that the pressure wave running through the manifold 5, 25, 36 from successive cylinder exhaust operations are damped by the constrictions and thereby smoothed out. There is the further possibility that, by providing an eccentric position for the connecting exhaust ducts 24, as illustrated in FIG. 2, unsymmetrical conditions for the flow-past of the exhaust gases in the longitudinal direction of the manifold can be produced, to obtain thereby an improvement of the damping of the pressure waves.

Although the invention has been described with reference to particular illustrative examples, it is to be understood that variations are possible within the inventive concept. Thus, for example, the connecting exhaust ducts may be provided with round or oval cross sections instead of with rectangular cross sections.

We claim:

1. In a two-stroke-cycle multicylinder internal combustion engine having an exhaust port provided for each cylinder and having connecting exhaust ducts, each individual to a single cylinder of the engine, running between the exhaust port of said cylinder and a substantially cylindrical common exhaust discharge manifold, the improvement wherein each connecting exhaust duct (4, 24, 35) is extended to as to project into the manifold (5, 25, 36) to such an extent that the portion of the duct that projects into the manifold has an end (7) therein, extends therein for a length not less than half the diameter of the manifold and, at least in the region of said portion, has a continuously broadening cross-section, and wherein said portion is directed substantially perpendicularly to the axis (A—A) of the manifold and has an opening transverse to the duct axis at said end (7) which opens into said manifold and wherein, further, said manifold has a wall facing said open end of each connecting exhaust duct, and at least said open end (7) of each connecting exhaust duct (4, 24, 35), by reason of the amount of free discharge area between the exhaust duct and said facing wall of said manifold, forms a pressure-gradient diffusor in cooperation with said facing wall acting as a baffle, the said continuously broadening cross-section in at least said projecting portion of each connecting exhaust duct also contributing to the formation of said diffusor.

2. Improvement in a two-stroke-cycle multicylinder internal combustion as defined in claim 1 in which each connecting exhaust duct (4, 24, 35) projects into the manifold (5, 25, 36) to such an extent that the free discharge area between the exhaust duct (4, 24, 35) and said facing wall (8) of the manifold (5, 25, 36) together forming said pressure-gradient diffuser, is greater than the exit cross-sectional area of the exhaust duct (4, 24, 35).

3. Improvement in a two-stroke-cycle multicylinder internal combustion engine as defined in claim 1 in which the exhaust ports of the cylinders open respectively into said exhaust ducts and in which each connecting exhaust duct (4, 24, 35) has a narrowest cross-section which is approximately equal to the cross-section of the respective exhaust port (3, 22, 34) opening into the respective exhaust duct from the respective cylinder (1, 20, 33).

4. Improvement in a two-stroke-cycle multicylinder internal combustion engine as defined in claim 1 in which said ends (7) of the connecting exhaust ducts (4, 24, 35) in said manifold have a rectangular cross-section.

5. Improvement in a two-stroke-cycle multicylinder internal combustion engine as defined in claim 4 in which the longer sides of the rectangular cross-section of the discharge opening of each of said connecting exhaust ducts (4, 24, 35) are substantially parallel to the longitudinal axis (A—A) of the manifold (5, 25, 36).

6. In a two-stroke-cycle multicylinder internal combustion engine having an exhaust port provided for each cylinder and having connecting exhaust ducts, each individual to a single cylinder of the engine and running between the exhaust port of said cylinder and a substantially cylindrical common exhaust discharge manifold, the improvement wherein each of said connecting exhaust ducts (4, 24, 35) is extended so as to project into the manifold (5, 25, 36) to such an extent that the portion of the duct that projects into the manifold has an end (7) therein and extends therein for a length not less than half the diameter of the manifold and said portion is directed substantially perpendicularly to the axis (A—A) of the manifold and has an opening transverse to the duct axis at said end (7) which opens into said manifold and wherein, further, the manifold (5, 25, 36) has sections (14) of reduced diameter and cross-section between the respective ends (7) of the connecting exhaust ducts (4, 24, 35).

7. Improvement in a two-stroke cycle multicylinder internal combustion engine as defined in claim 6 in which the sections of the manifold of reduced cross-section are so disposed as to provide baffling between adjacent connecting exhaust ducts.

8. Improvement in a two-cycle multicylinder internal combustion engine as defined in claim 6 in which the manifold (5, 25, 36) is composed of alternate sections respectively of two different diameters and substantially annular junction disks (15) in order to provide the manifold sections of reduced cross-section (14).

9. Improvement in a two-cycle multicylinder internal combustion engine as defined in claim 6 in which the connecting exhaust ducts (24) have an eccentric position in the manifold (25) with respect to the longitudinal axis of the manifold.

10. Improvement in a two-stroke-cycle multicylinder internal combustion engine as defined in claim 8 in which the alernate sections of larger diameter of said manifold have a first axis as a common axis and the alternate sections of smaller diameter and of reduced cross-section of said manifold have a second axis as a common axis and said first axis is offset from the second axis towards the exit end of the connecting ducts, and in which said connecting duct ends overlap said annular junction disks.

* * * * *